United States Patent [19]
Haworth et al.

[11] 3,727,998
[45] Apr. 17, 1973

[54] GAS TURBINE ENGINE

[75] Inventors: Lionel Haworth, Bristol; Cyril Blea, Chellaston; Michael Poucher, Duffield, all of England

[73] Assignee: The Secretary of State for Defence in Her Britannic Majesty's Government of the United Kingdom of Great Britain and Northern Ireland, London, England

[22] Filed: Nov. 19, 1971

[21] Appl. No.: 200,394

[30] Foreign Application Priority Data

Nov. 21, 1970 Great Britain.....................55,494/70

[52] U.S. Cl..............................308/184 R, 308/26
[51] Int. Cl...............................................F16c 27/06
[58] Field of Search................................308/26, 184

[56] References Cited

UNITED STATES PATENTS

| | | | |
|---|---|---|---|
| 3,005,668 | 10/1961 | Szydlowski | 308/184 R |
| 3,101,979 | 8/1963 | Mard | 308/26 |
| 3,163,353 | 12/1964 | Petrie | 308/184 R |
| 3,263,907 | 8/1966 | Van Nimwegan | 308/184 R |
| 3,283,678 | 11/1966 | Domenighetti | 308/184 R |
| 3,205,024 | 9/1965 | Morley et al. | 308/184 R |
| 3,245,734 | 4/1966 | Morley et al. | 308/184 R |
| 3,357,757 | 12/1967 | Morley et al. | 308/26 |
| 3,473,853 | 10/1969 | Goss et al. | 308/26 |

*Primary Examiner*—Charles J. Myhre
*Assistant Examiner*—B. Grossman
*Attorney*—Cushman, Darby & Cushman

[57] ABSTRACT

The invention relates to a gas turbine engine in which there is a rotor carried from a shaft, a first bearing supporting the shaft adjacent the rotor, a second bearing supporting the shaft remote from the rotor and a third bearing supporting the shaft at a further distance from the rotor. The first bearing is mounted so that under conditions of extreme inbalance of the rotor its supporting structure deforms to allow the rotor to invert, and the second bearing is adapted to allow rotation of the shaft during and after the inversion.

16 Claims, 7 Drawing Figures

GAS TURBINE ENGINE

This invention relates to a gas turbine engine.

In a gas turbine there is normally at least one shaft system comprising a rotor supported from a shaft and a number of bearings; commonly such systems are used to support the compressors and turbines of the engine. A problem arises, particularly in engines having large and heavy blades on rotors, should one or more blades become detached; a large out of balance load is put on the shaft system and may be so large as to cause damage to the bearings and support structure.

The present invention provides a way in which such occurrences may be dealt with without destroying major parts of the structure of the engine, and the invention makes use of the phenomenon known as inversion. Throughout this specification the term inversion is to be taken to mean the mechanism by which a rotor supported from a shaft and rotating above its critical rotational speed, after becoming unbalanced by losing a part of its mass achieves a stable condition by altering its axis of rotation so that the new axis passes through the new center of mass of the rotor.

According to the present invention a gas turbine engine comprises a shaft which supports a rotor, a first bearing supporting the shaft adjacent the rotor, a second bearing supporting the shaft remote from the rotor and a third bearing supporting the shaft at a further distance from the rotor, said first bearing being adapted to allow the rotor to invert should it become unbalanced and said second bearing being adapted to allow said shaft to rotate therein about its altered axis during and after inversion.

Preferably said first bearing comprises deformable structure which is adapted to absorb energy by deforming when said rotor becomes unbalanced and to provide damping to cause the rotor to invert. Thus the first bearing may comprise a rolling element bearing surrounded by deformable structure.

In a preferred embodiment said deformable structure comprises a hollow toroid of ductile metal.

The second bearing may comprise a rolling element bearing co-operating with part spherical sliding surfaces to allow said tilting, and the sliding surfaces may normally be held in fixed relationship by a frangible or deformable stop which breaks or is deformed when the rotor becomes excessively unbalanced.

The present invention will now be described with reference to the accompanying drawing in which:

FIG. 1 is a section through a gas turbine engine in accordance with the invention, FIG. 2 is an enlarged view of a low pressure shaft and rotor of the engine of FIG. 1, FIGS. 3, 4, 5 and 6 are sections through alternative versions of one of the bearings of FIG. 2, and FIG. 7 is a sectional view through an alternative version of another bearing of the gas turbine engine.

In FIG. 1 a gas turbine engine comprises a fan 10 connected by shafting 11 to a low pressure turbine 12, an intermediate pressure compressor 13 connected by shafting 14 to an intermediate pressure turbine 15 and a high pressure compressor 16 connected by shafting 17 to a high pressure turbine 18. The intermediate and high pressure components are housed within a main casing 19 which encloses the combustion section 20, while the fan is enclosed within a fan casing 21. The engine operates in the normal fashion in that air is compressed by the fan and the intermediate and high pressure compressors, combustion takes place in the combustion section and the products of combustion drive the turbines and provide a propulsive exhaust. This propulsion is in addition to that provided by the remainder of the fan air which is not compressed by the high pressure compressors.

In FIG. 2 there is shown in greater detail the fan rotor 10 and the low pressure shaft 11. The shafting 11 comprises a forward section 22 and a rearward section 23 joined together by splines 24 and retained axially by a ring nut end locking arrangement 25. The forward part of the shaft 22 carries at its front extremity a rotor 26 which carries the fan blades and forms the fan 10. Adjacent the rotor 26 the shaft is carried in a roller bearing 27. The shaft 22 carries an annular extension 28 bolted to its front extremity adjacent the rotor 26, and the external surface of the extension 28 is mounted within the inner race of the rolling element bearing 27. The outer race of this bearing is mounted inside a hydraulic squeeze film carried within an annular member 29, which itself is carried within a toroidal hollow ductile metal part 30. The part 30 is carried by a diaphragm structure 31 from the main casing of the engine.

To support the member 29, and consequently the bearing 27, axially, flange portions 32 and 33 are provided with the member 29 trapped therebetween so that it can slide in a radial direction but is restrained from doing so by engagement with the toroidal member.

The other extremity of the forward portion 22 is supported by a middle bearing 34 which is carried from the rotor 35 of the intermediate pressure compressor. This bearing comprises a rolling element bearing 36 mounted by way of bolts 37 from a diaphragm 39 which forms part of the compressor rotor. The internal surface of the inner race of the bearing carries an articulating piece 40 whose inner surface is formed as a part sphere which engages with the external part spherical surface of a support piece 41 which in turn carries the extremity of the shaft portion 22.

In addition to the first and second bearings 27 and 34, a third bearing 42 is provided to support the low pressure shaft 11, this bearing being a tail bearing which is located at the turbine end of the shaft. The bearing 42 comprises a simple roller bearing and supports this end of the shaft from fixed structure of the engine.

Operation of the system is as follows: Under normal circumstances the front middle and rear bearings act in the normal fashion to support the shaft and allow it to rotate about its axis, and the strength of the toroidal member is arranged to be sufficient to withstand normal running loads. Should the fan rotor 10 become unbalanced, such for instance as may occur should one of the fan blades become detached, a large out of balance moment will act through the roller bearing 27 onto the toroidal member 30. Under this large stress the toroidal member will become deformed into a substantially flat ring, allowing the shaft and rotor to orbit within the clearance provided. This orbiting will not be completely undamped since engagement between the bearing structure and the flange portions 32 and 33 will provide frictional damping of the orbiting motion; the action of crushing the toroid will also provide some initial damping. An alternative bearing arrangement for the first bearing 27 is shown in FIG. 7 wherein the toroidal member 30 is filled with a crushable material 60. This arrangement increases the initial dampening when the toroidal member 30 is deformed under conditions of large stress.

When the shaft is orbiting in this fashion the axis of the shaft 22 becomes deflected with respect to the rearward portion 23. Deflection of the shaft takes place, and movement of the inner part spherical piece 41 with respect to the outer piece 40 allows the middle bearing 34 to run with the shaft in its deflected condition.

After the shaft has made a limited number of rotations in this essential unstable condition, the shaft inverts, that is it alters its mode of rotation so that its new rotational axis passes through its new center of gravity, consequently stabilizing its rotation. The clearance allowed by the deformation of the toroidal member is arranged to be sufficient to allow the necessary orbiting under any expected unbalance while the sliding motion between the part spherical portions on the middle bearing allows the shaft to run in its deflected condition when inverting and following inversion. Consequently the engine will run relatively smoothly in its inverted condition supported by the middle and rear bearings and there will be little danger of further damage to the engine structure.

In the embodiment described above it will be seen that there is no positive location between the part spherical surfaces on the rear bearing under normal conditions of operating and it may prove necessary to provide some such location. FIGS. 3, 4 and 5 show alternative ways of providing such location. In FIG. 3 an annular flange 43 is provided which engages with the outer portion. The flange has a shear neck at 44 which is so dimensioned that it fractures under excessive load and allows the necessary sliding movement.

Figure 1:
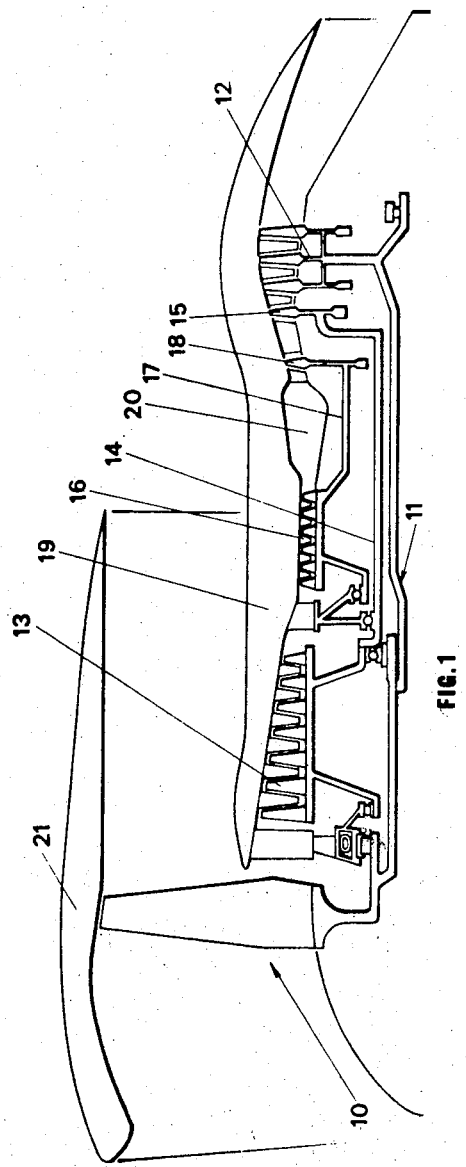
Figure 2:
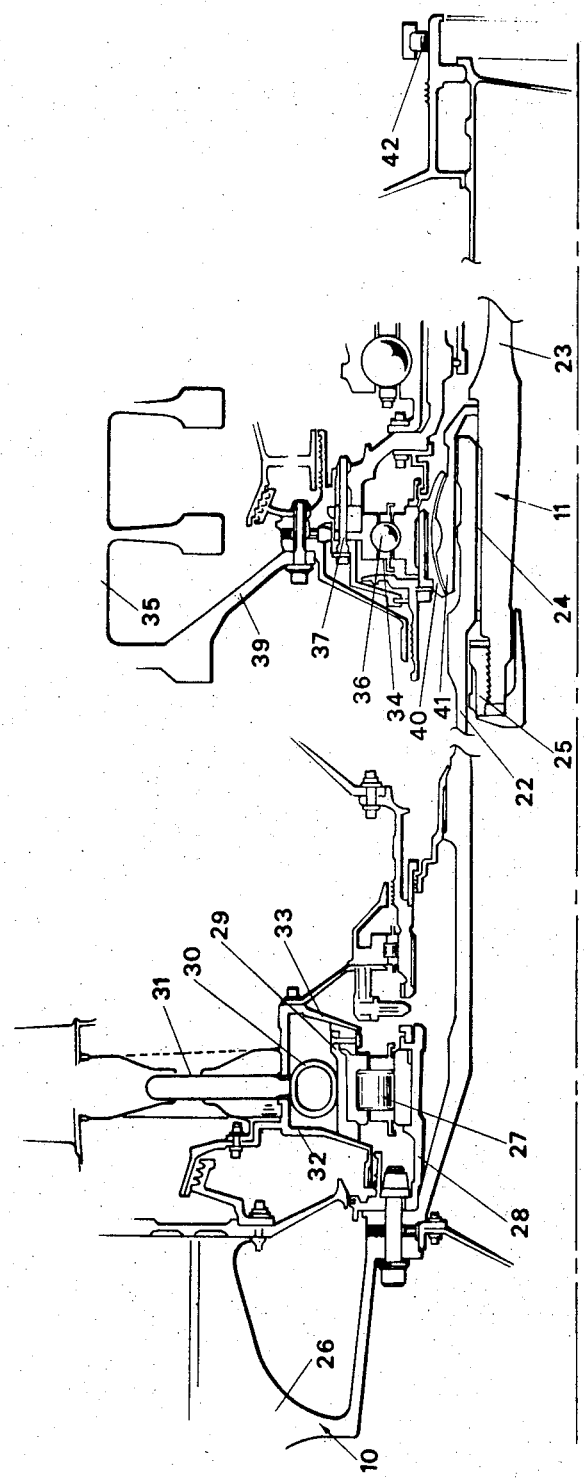
Figure 3:
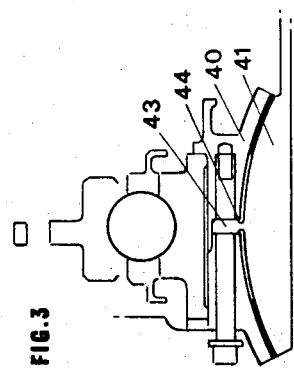
Figure 5:
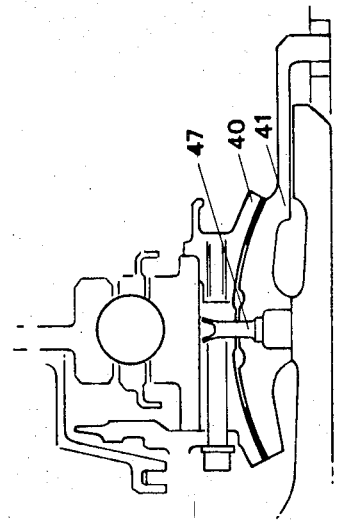
FIG. 5 shows a third proposal in which a number of soft metal pins 47 retain the outer portion and the inner portion in fixed relationship. Under an overload the pins will shear and allow relative sliding.
Figure 4:
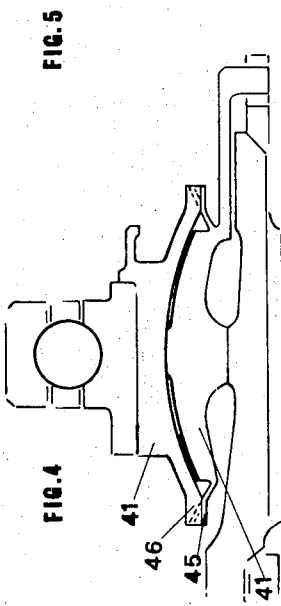
FIG. 4 shows an arrangement in which the inner sliding portion is provided with an axially extending annular flange 45 which normally engages with a similar flange 46 extending from the outer member. Under overload conditions the flanges are arranged to deform to allow the necessary movement.
Figure 6:
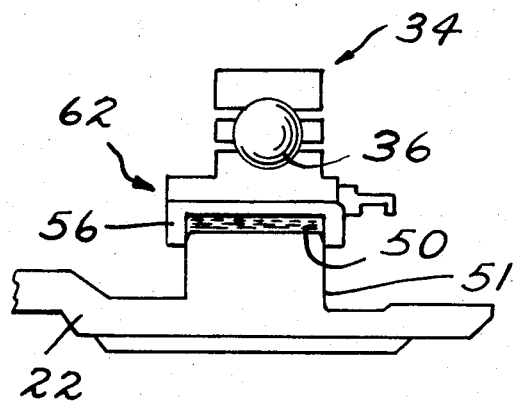
Figure 7:
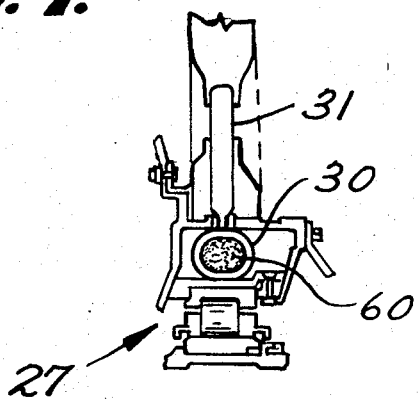

It will be appreciated that although the above proposal shows the use of a particular form of deformable structure which allows the necessary inversion of the rotor system, there could be a number of alternatives which would be evident to those skilled in the art. Thus, in some circumstances the bearing could be mounted on springs or frangible metal supports, or it could be mounted on hydraulic cylinders or the like to give a similar effect. Again although the invention is most usefully applied to the fan shaft of a gas turbine engine, where overloads due to blade loss are likely to be of large magnitude, the invention would obviously be applicable to any rotor of the engine. It will be noted that the middle bearing in the above embodiment uses part spherical sliding surfaces to allow inverted rotation of the shaft. It would of course of possible to use alternative methods. Thus, for instance one could use a rolling element bearing which allows inverted rotation by itself, or alternatively the whole bearing could be mounted on structure which allows inversion. As shown in FIG. 6 and depending upon the magnitude of the likely out-of-balance, it may be possible to use a normal rolling element bearing which is mounted in a hydrodynamic squeeze film bearing generally indicated at 62, thus providing sufficient clearance to allow the inverted motion of the shaft. The spherical engagement shown in the arrangements of FIGS. 3 through 5 are eliminated in the arrangement of FIG. 6 and replaced by a squeeze film 50 formed between an inner annular projection 51 from the shaft 22 and an outer annular channel member 52 carried from the inner track of the bearing element 36. A oil feed (not shown) causes oil to flow into the annular clearance between 51 and 52 and thus there is formed the annular squeeze film 50 for permitting inverted rotation or motion of the shaft.

We claim:

1. A gas turbine engine comprising a shaft which supports a rotor, a first bearing supporting the shaft adjacent the rotor, supporting structure for said first bearing, a second bearing supporting the shaft remote from the rotor, supporting structure for the second bearing, and a third bearing supporting the shaft at a further distance from the rotor, said supporting structure for the first bearing being adapted to deform to give the bearing radial freedom to allow the rotor to invert should it become excessively unbalanced and said second bearing being adapted to move in its supporting structure and allow said shaft to rotate therein about its altered axis during and after inversion.

2. A gas turbine engine as claimed in claim 1 and in which said deformable structure is adapted to absorb energy by deforming when said rotor becomes unbalanced and to provide damping to cause the rotor to invert.

3. A gas turbine engine as claimed in claim 1 and in which the first bearing comprises a rolling element bearing surrounded by deformable structure.

4. A gas turbine engine as claimed in claim 3 and in which said deformable structure comprises a hollow toroid of ductile metal.

5. A gas turbine engine as claimed in claim 4 and in which said hollow toroid is filled with a crushable material.

6. A gas turbine engine as claimed in claim 2 and in which said supporting structure comprises friction surfaces and said first bearing is mounted in frictional engagement with said surfaces which allow damped movement of the bearing during and after inversion.

7. A gas turbine engine as claimed in claim 6 and in which said surfaces comprise part-spherical surfaces struck about a point on the normal shaft axis.

8. A gas turbine engine as claimed in claim 1 and in which the second bearing comprises a rolling element bearing in which the inner race is able to move with respect to the outer race to allow said motion of the shaft in the inverted condition.

9. A gas turbine engine as claimed in claim 1 and in which there is a hydrodynamic squeeze film in which the outer race of said second bearing is mounted, the squeeze film being adapted to allow sufficient movement to allow said motion of the shaft in the inverted condition.

10. A gas turbine engine as claimed in claim 1 and in which the second bearing comprises a rolling element bearing and there are part-spherical sliding surfaces which mount said second bearing to allow said inverted motion.

11. A gas turbine engine as claimed in claim 10 and in which there is a frangible or deformable stop which normally holds the sliding surfaces in fixed relationship, said stops being adapted to break or deform when the rotor becomes excessively unbalanced.

12. A gas turbine engine as claimed in claim 11 and in which said stop comprises a radial flange which is necked at its base to make it frangible.

13. A gas turbine engine as claimed in claim 11 and in which said stop comprises a plurality of soft metal pins adapted to shear to allow said inverted motion.

14. A gas turbine engine as claimed in claim 11 and in which said stop comprises a deformable flange on one said surface which co-operates with a similar flange on the other said surface and which deforms to allow said inverted motion.

15. A gas turbine engine as claimed in claim 1 and in which said shaft is made in two parts connected by a splined connection.

16. A gas turbine engine as claimed in claim 15 and in which said splined connection lies adjacent said second bearing.

* * * * *